United States Patent
Wainner et al.

(10) Patent No.: US 10,104,050 B2
(45) Date of Patent: Oct. 16, 2018

(54) AUTHENTICATED GROUP CONTEXT IN TRANSITIVE IP NETWORK DOMAINS

(71) Applicant: CISCO TECHNOLOGY, INC., San Jose, CA (US)

(72) Inventors: Warren Scott Wainner, Sterling, VA (US); Brian E. Weis, San Jose, CA (US); Paul Quinn, Wellesley, MA (US); Scott Roy Fluhrer, North Attleboro, MA (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 15/146,695

(22) Filed: May 4, 2016

(65) Prior Publication Data
US 2017/0324714 A1    Nov. 9, 2017

(51) Int. Cl.
*H04L 29/06* (2006.01)

(52) U.S. Cl.
CPC ........ *H04L 63/0471* (2013.01); *H04L 63/029* (2013.01); *H04L 63/08* (2013.01); *H04L 63/10* (2013.01); *H04L 67/42* (2013.01)

(58) Field of Classification Search
USPC .......................................................... 726/4
See application file for complete search history.

(56) References Cited

U.S. PATENT DOCUMENTS

| | | | |
|---|---|---|---|
| 2011/0023090 A1* | 1/2011 | Asati ................... | H04L 12/4633 726/4 |
| 2014/0362857 A1* | 12/2014 | Guichard .............. | H04L 45/566 370/392 |

OTHER PUBLICATIONS

Biggs, A., et al., "Key Management Service Architecture," Networking Working Group Internet Draft, Nov. 17, 2014, 48 pages; https://tools.ietf.org/pdf/draft-abiggs-saag-key-management-service-00.pdf.
Mattsson, J., et al., "MIKEY-TICKET: Ticket-Based Modes of Key Distribution in Multimedia Internet KEYing (MIKEY)," Internet Engineering Task Force (IETF), RFC 6043, Mar. 2011, 58 pages; https://tools.ietf.org/pdf/rfc6043.pdf.
Weis, B., et al., "The Group Domain of Interpretation," Internet Engineering Task Force (IETF), RFC 6407, Oct. 2011, 64 pages; https://tools.ietf.org/pdf/rfc6047.pdf.

* cited by examiner

*Primary Examiner* — Brandon S Hoffman
*Assistant Examiner* — Samuel Ambaye

(57) ABSTRACT

A method is provided in one example embodiment and includes receiving at a node of a transitive IP network a data packet including a Network Services Header ("NSH"); accessing by the transitive IP network node context contained in the NSH, wherein the context may be used by the transitive IP network node to perform an enhanced network service in connection with the received data packet; performing by the transitive IP network node the enhanced network service in connection with the received data packet using the accessed context; and, subsequent to the performing, forwarding the received packet to a next node.

20 Claims, 9 Drawing Sheets

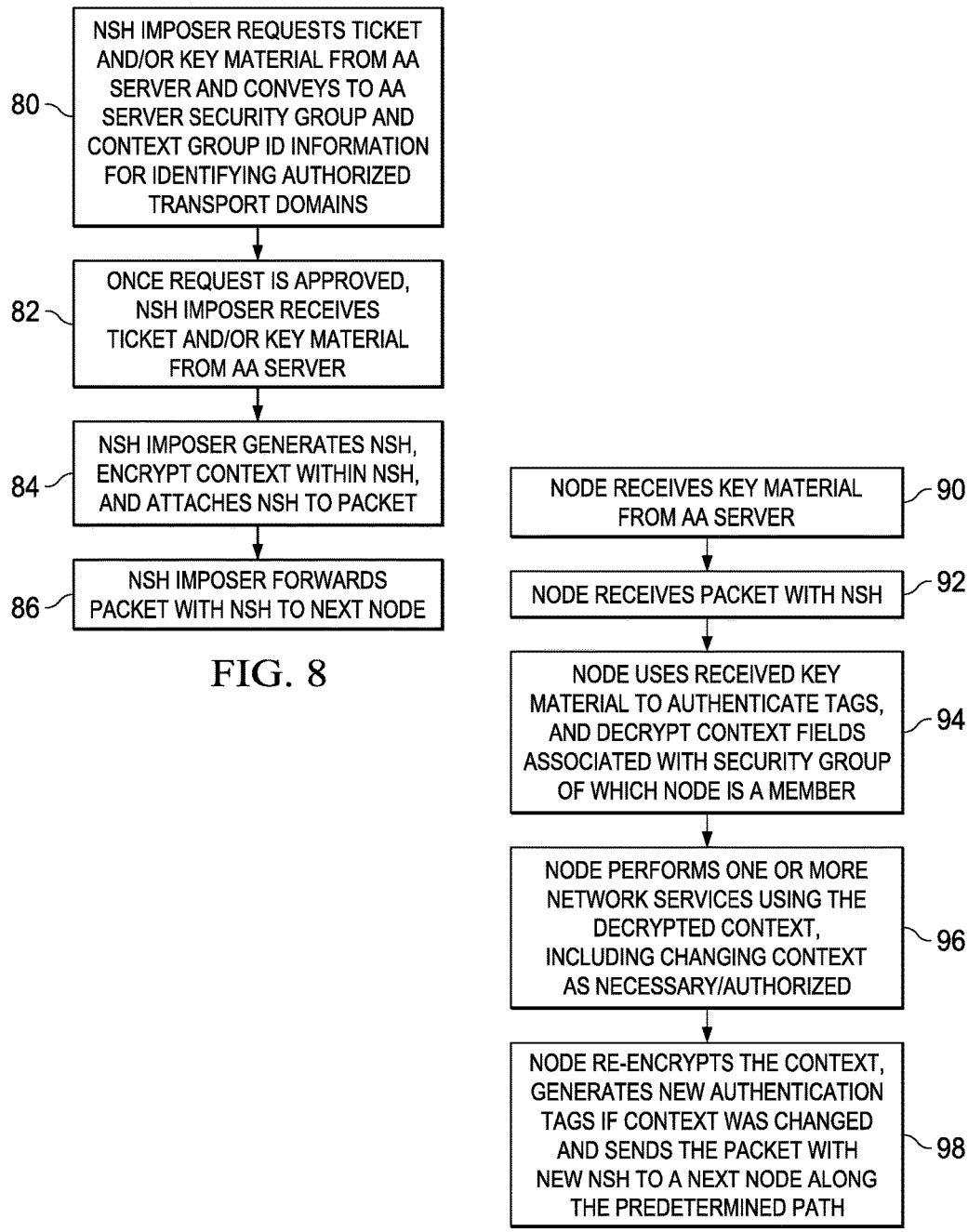

AUTHENTICATED GROUP CONTEXT IN TRANSITIVE IP NETWORK DOMAINS

TECHNICAL FIELD

This disclosure relates in general to the field of communications networks and, more particularly, to techniques for providing authenticated group context in transitive IP network domains in connection with such communications networks.

BACKGROUND

The Internet provides an open environment in which clients and servers or peers can exchange information that traverses multiple Internet Protocol ("IP") networks managed by independent provider entities. Many business enterprises do not want to directly expose clients/servers to the Internet due to an elevated risk of attack. Instead, enterprises may choose to implement technologies to segregate their client/server communications from the Internet. Such technologies may include MPLS VPN, LTE MIP, LISP, and others. In some cases, an overlay VPN technology, such as IPsec, may also be used for securing traffic from branch office to data center. The enterprise may elect to transmit contextual metadata in the overlay tunneling protocol, which context should be preserved end-to-end.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 8 is a flowchart illustrating example steps that may be performed by an NSH imposer in accordance with features of embodiments described herein for providing authenticated group context in transitive IP domains;

FIG. 9 is a flowchart illustrating examples steps that may be performed by a transitive IP domain node in accordance with features of embodiments described herein for providing authenticated group context in transitive IP domains;

DETAILED DESCRIPTION OF EXAMPLE EMBODIMENTS

Overview

Figure 1:
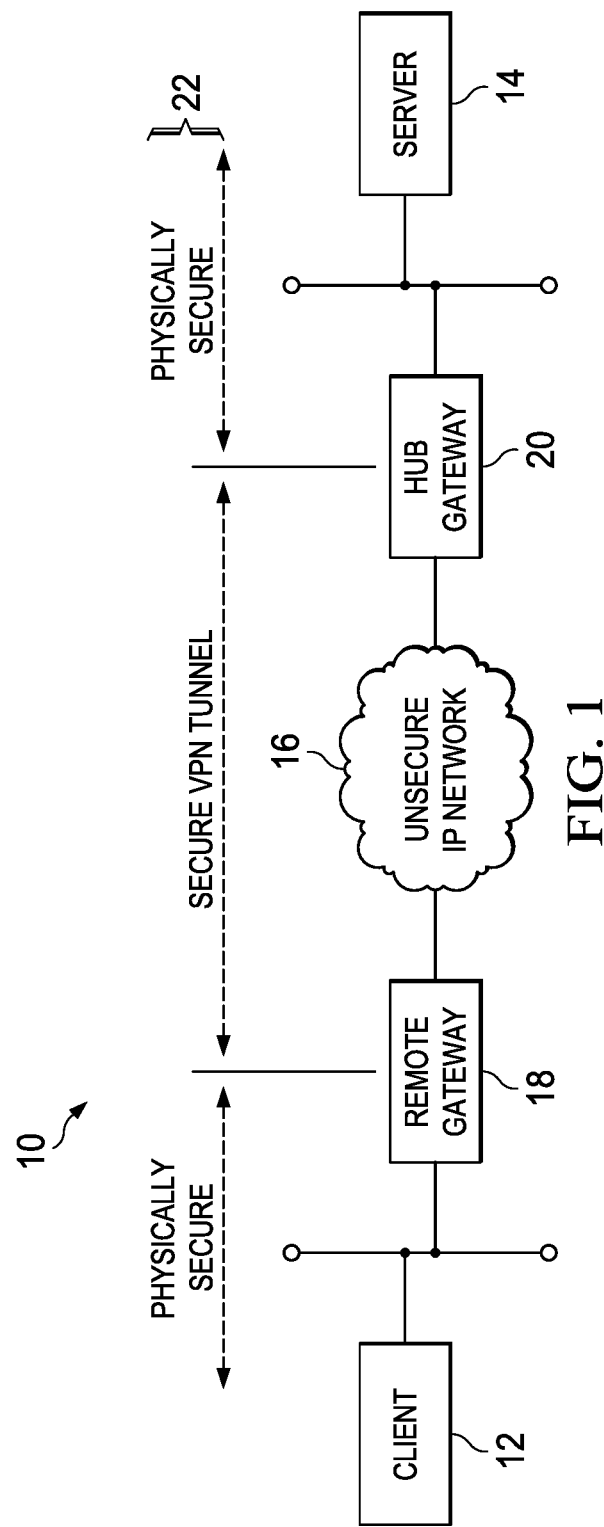
FIG. 1 illustrates a simplified block diagram of a communications network in which an IPsec tunnel provides a secure connection between enterprise CPE over an IP network.

A method is provided in one example embodiment and includes receiving at a node of a transitive IP network a data packet including a Network Services Header ("NSH"); accessing by the transitive IP network node context contained in the NSH, wherein the context may be used by the transitive IP network node to perform an enhanced network service in connection with the received data packet; performing by the transitive IP network node the enhanced network service in connection with the received data packet using the accessed context; and, subsequent to the performing, forwarding the received packet to a next node.

Example Embodiments

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "encrypted", in all of its grammatical forms, is used throughout the present specification and claims to refer to any appropriate encryption methods for encrypting a data stream, and/or any other appropriate method for intending to make a data stream unintelligible except to an intended recipient(s) thereof. Well known types of encrypting include, but are not limited to DES, 3DES, and AES. Similarly, the term "decrypted" is used throughout the present specification and claims, in all of its grammatical forms, to refer to the reverse of "encrypted" in all of its grammatical forms.

Pursuant to the above definitions, the terms "encoded" and "encrypted" are used to refer to different and exclusive types of processing. Thus, a particular data stream may be, for example:
encoded, but not encrypted;
encrypted, but not encoded;
encoded and encrypted; or
neither encoded nor encrypted.

Likewise, the terms "decoded" and "decrypted" are used to refer to different and exclusive types of processing.

A variety of IP tunneling technologies, such as LISP, GRE, IPsec, and MPLS VPN, exist to enable transport of client/server information exchange over IP networks without exposing the information to the Internet. Many other domain specific tunneling technologies, such as Segment Routing and RSVP-TE in MPLS, GTP in LTE, and VxLAN in the Data Center, also exist. If it is assumed that any context created and exchanged between the client and server is irrelevant to the intervening network, then the context can be transparently passed between the client and server through their secure connection (e.g. SSL, TLS, SPDY) or overlay tunnel (e.g. IPsec or GRE). However, if the context created and exchanged between the client and the server is relevant to the underlying network, it must be exposed outside of the secure connection or overlay described above. It is often the case that the context is hidden (encrypted), translated specifically for a particular transport domain (e.g., mapped into specific transport headers such as GTP or LSP), or simply dropped.

Historically, network-relevant context has been limited to quality of service ("QoS") attributes that are mapped into Differentiated Service Code Points ("DSCP"). Conveying context using DSCP has been fraught with problems because each transitive IP (or transport) domain may reset the values, ignore them, or interpret them differently. Specific context may be relevant to multiple domains (e.g., LTE network and MPLS VPN and Virtual Private Cloud), yet there are limited means to preserve, reveal, and secure the context as IP packets traverse one or more transport domains especially when the flow is encrypted.

FIG. 1 is a simplified block diagram of a communications network 10. As shown in FIG. 1, the network 10 includes a client device 12 connected to a server device 14 via an IP network 16. Customer premises equipment ("CPE"), which may be implemented as a remote gateway 18, provides a connection between the client device 12 and the IP network 16. Similarly, CPE, which may be implemented as a hub gateway 20, provides a connection between the server device 14 and the IP network 16. As shown in FIG. 1, the connection between client device 12 and remote gateway 18 is physically secure. Similarly, a connection between hub gateway 20 and server device 14 is physically secure. Because a connection between remote gateway 18 and hub gateway 20 is an unsecured IP network connection, a secure VPN tunnel 22 may be established between the two devices 18, 20, such that the end-to-end connection between client device 12 and server device 14 is secure.

In accordance with features of embodiments described herein, there may be numerous examples of network relevant context. One type of context might include the security posture of an end-point (e.g., guest, contractor, employee, executive) that is currently conveyed using a Security Group Tag ("SGT"). Today, this information must be encoded into each tunnel mechanism. It must also be mapped from one tunnel mechanism to another. Given the inconsistent capabilities between tunneling mechanisms, the context is often lost. There are many other examples of network relevant context, such as context describing end-point attachment methods, geophysical location, or price-sensitive access circuits associated with an end-point, which may be relevant to one or more transit domains.

Figure 2:
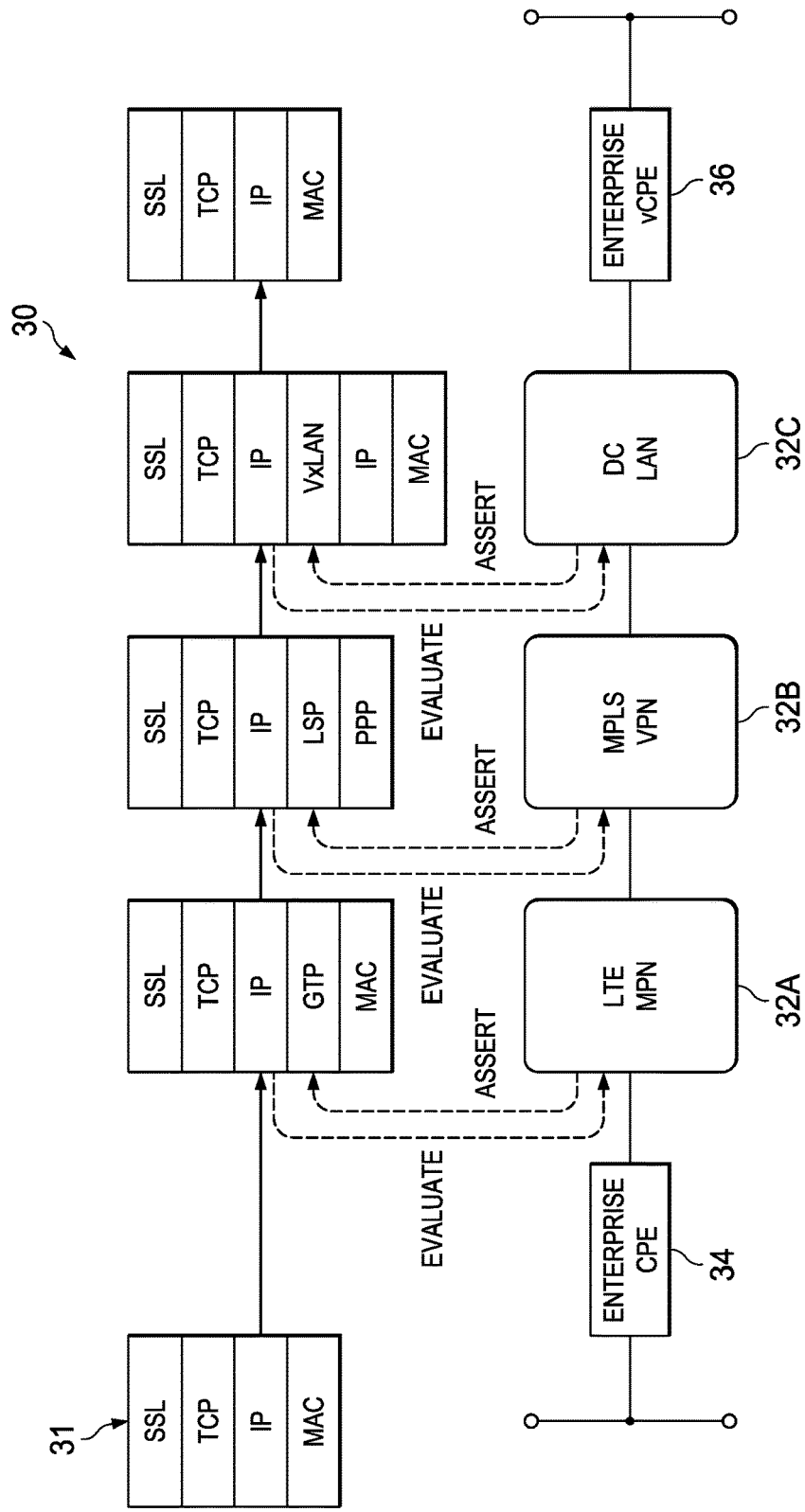
FIG. 2 illustrates a simplified block diagram of a communications network in which packets are communicated between enterprise CPE via a plurality of transitive IP domains and in which context is derived from IP headers of packets or inferred from the packets.
Figure 3:
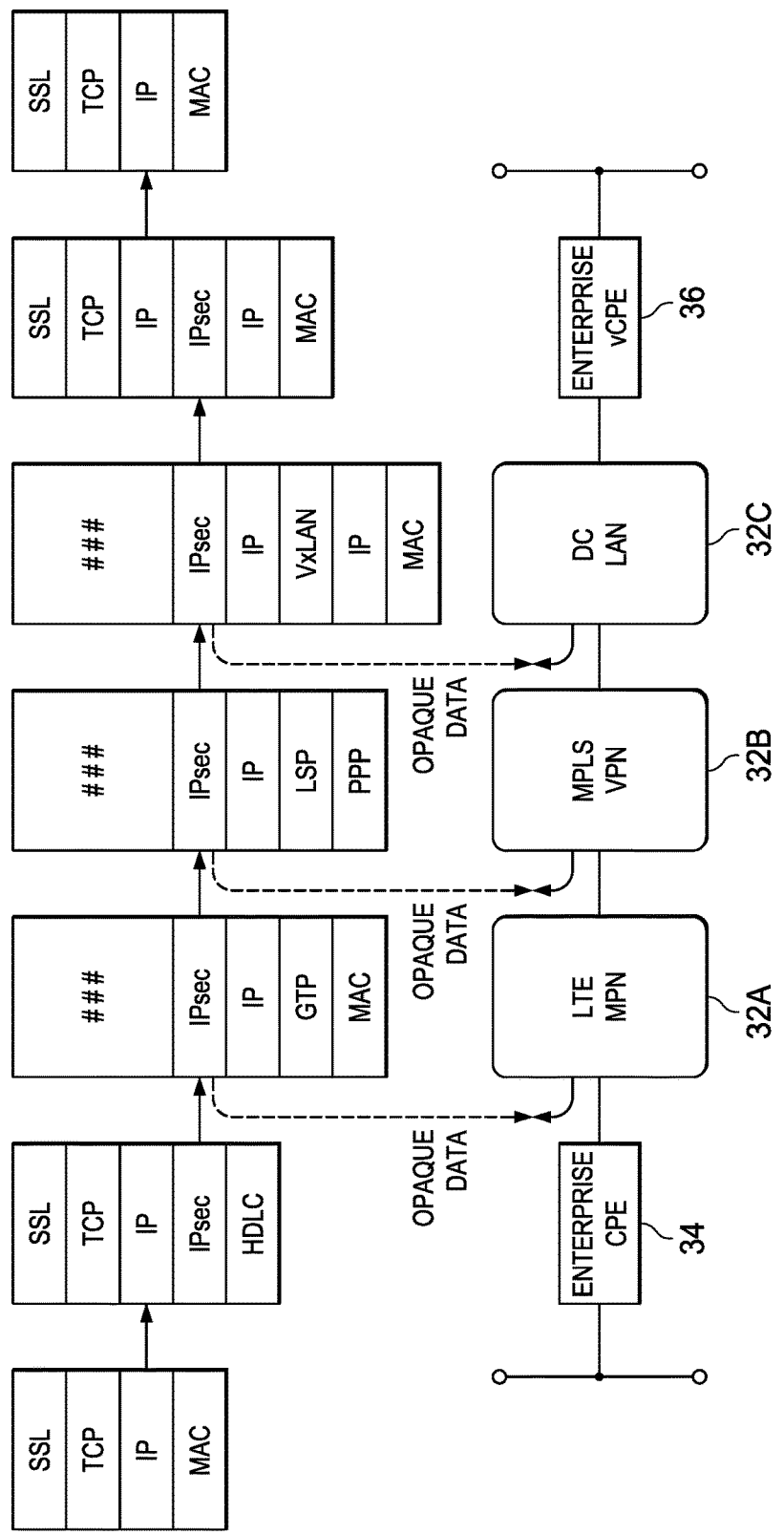
FIG. 3 illustrates a simplified block diagram of a communications network in which IPsec encapsulation obscures portions of packet, including context, from the underlying transitive IP domains.
Figure 4:
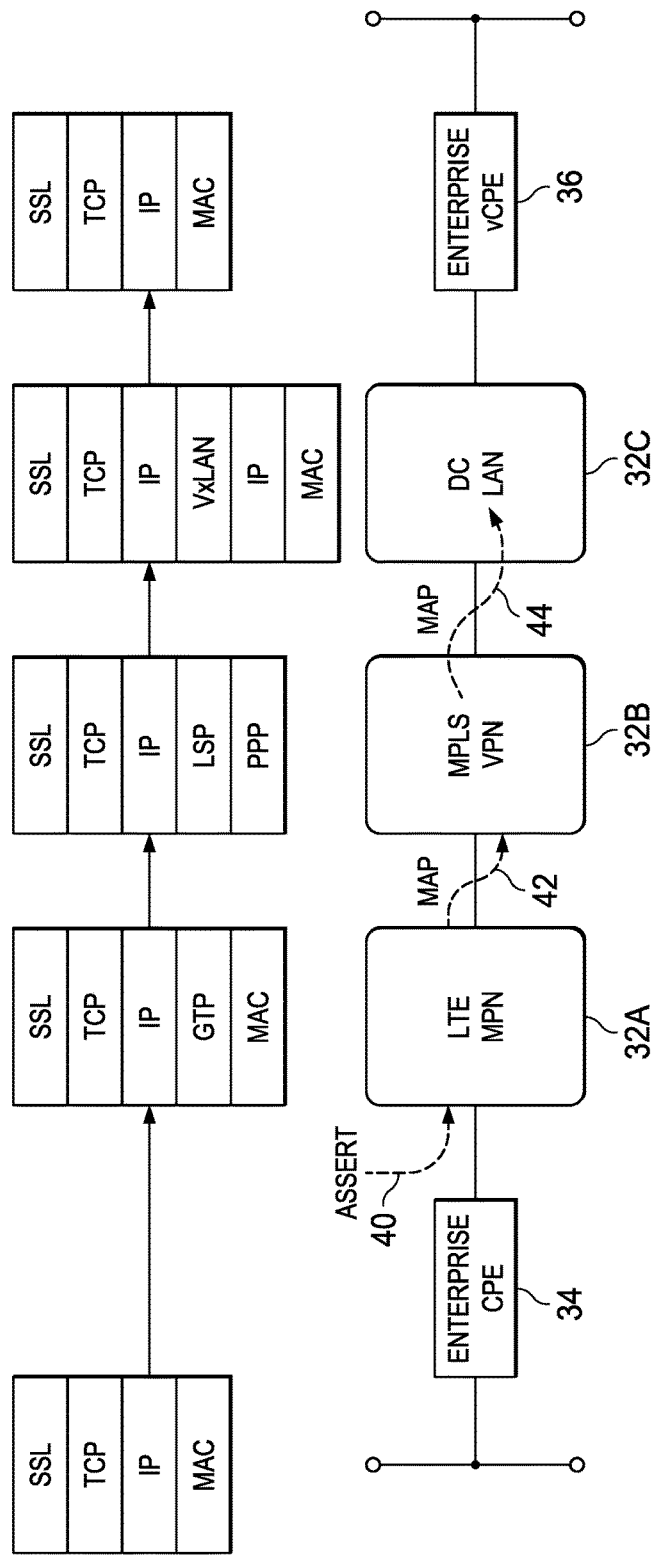
FIG. 4 illustrates a simplified block diagram of a communications network in which context is associated at an ingress to a first transitive IP domain and mapped between remaining transitive domains.

In order to convey context from one end of an enterprise (e.g., a branch office) to another (e.g., a data center), there are several options that do not work well, some of which may include inferring context, embedding context in IP headers, and context by association. Specifically, as illustrated in FIG. 2, in a communications network 30, context may be inferred by evaluating the payload of a packet 31 as it traverses each transport domain, represented in FIG. 2 by a transport domains 32A-32C, from a first CPE 34 to a second CPE 36. As illustrated in FIG. 2, transport domains 32A-32C may be implemented as LTE MPN, MPLS VPN, and DC LAN, respectively. Inferring context, as illustrated in FIG. 2, may be problematic, as the payload is often encrypted by the enterprise, and thereby opaque to the transport domains 32A-32C, and the interpretation is undefined, as illustrated in FIG. 3. Referring again to FIG. 2, context embedded, or mapped, into standard IP headers (e.g., DSCP in IPv4 or IP Extension Headers in IPv6) may be resolved on the domain boundaries in exactly the same way (e.g., by mapping). Each domain must use a globally recognized method to interpret the context and to act upon the context. This method is acceptable for a small subset of context; however, it doesn't facilitate flexible definitions of context and provides no means of authenticating and authorizing access to context. In a context by association scenario, as illustrated in FIG. 4, context is explicitly defined, or asserted, at the entrance of the first transport domain (i.e., transport domain 32A) by static association, as represented in FIG. 4 by an arrow designated by a reference numeral 40. The context is then mapped at the hand-off from one transport domain to the next (e.g., from transport domain 32A to transport domain 32B and from transport domain 32B to transport domain 32C), as represented in FIG. 4 by arrows designated by reference numerals 42 and 44, respectively. It must be insured that each domain and mapping function maintains continuity of the context end-to-end. This method is unacceptable to most enterprises, as some form of confidentiality of context may be required. In addition, it requires that every transport domain (e.g., transport domains 32A-32C) participate in mapping the context into their respective tunneling mechanisms, which may be overly burdensome.

Most of the foregoing "solutions" fail to meet the needs of persistent context preservation and security. If the enterprise encrypts the IP flows between the branch and data center, all context is masked. Additionally, the methods of interpreting context in the domain specific transport layers is very rigid and the capabilities are often domain-specific (e.g., EXP bits in MPLS, 802.1p in IEEE Ethernet). Even IP header attributes are difficult to use, as one domain's interpretation of DSCP may differ from that of another domain. In fact, the Internet transport domains reset the DSCP such that all context is lost. In addition, there is no means to consistently hand-off context between the transitive domains at the inter-domain boundary, such as peering links.

As noted above, transitive IP VPN networks, or transport domains, 32A-32C, have been limited to evaluating the Differentiated Services Code Point ("DSCP") of the IP flows traversing the network because IPsec obfuscates data inside the Encapsulating Security Payload, as illustrated in FIG. 3. DSCP attributes are generally contextually overloaded and non-descriptive, which makes them prone to misinterpretation by the provider's transitive IP VPN networks. An enterprise may choose to implement several VPN technologies to improve their network coverage, to minimize their exposure to risk, and to optimize performance/costs. When two or more VPN methods are chained together (e.g. LTE Mobile Private Network and MPLS VPN), it is almost impossible for the enterprise to convey context end-to-end without creating a tunnel overlay. Context inserted in one VPN encapsulation method is not relayed to the next VPN encapsulation method. This concept is illustrated in FIGS. 2-4, in which three VPN methods, including an LTE MPN segment (transport domain 32A), an MPLS VPN segment (transport domain 32B), and a DC LAN segment (transport domain 32C) are chained together to provide a secure VPN connection between an enterprise CPE 34 and an enterprise CPE 36 over an IP network.

In such an environment, the only way an enterprise can convey context end-to-end is to create a tunnel overlay across all the existing VPN segments. The tunnel overlay also prevents the enterprise from leveraging provider on-path network services and masks the enterprise context from the transit IP network. Numerous examples exist where a transitive IP VPN provider may offer services such as whitelisting, blacklisting, caching, video compression, or security threat analysis services for enterprises. The enterprise may desire to take advantage of these services for specific classes of traffic, but it is very difficult to indicate which flows should take advantage of those services and how to insure that the context is preserved.

Embodiments described herein implement a technique in which an enterprise CPE router may convey immutable context end-to-end in IP flows across multiple VPN segmentation methods. The context enables network services providers the opportunity to detect and interpret the enterprise preference for on-path services (e.g. Segment Routing), while avoiding source routing, tunneling, or pinning traffic to specific network service locations.

IPv6 Extension Headers may be used to provide a means of inserting into an IPv6 packet universally understood context that is created and consumed by the client and server and that may include routing options, destination options, and packet encryption options. However, the extension headers may actually be encrypted and hidden from the transport domain as described above, making the context opaque to and unusable by intervening transport domains.

An objective of embodiments described herein is to enable transitive IP domains to provide enhanced services on behalf of the enterprise by making context necessary for performing those services available to the transitive IP domains. The most basic services (e.g. VPN segmentation and QoS prioritization) are presumed available based on existing mechanisms. Identifying specific enterprise flows that require enhanced service processing is extremely challenging especially in transitive IP domains. A transitive IP domain may represent a multi-nodal forwarding entity that transfers enterprise IP packets comprising a flow from a provider assigned enterprise ingress point (e.g., a provider edge ("PE") attachment circuit) to a provider assigned enterprise egress point (e.g., an attachment circuit) using a domain-specific tunneling mechanism. IP transport domains (or transitive IP domains) are loosely coupled to one another as peers through which IP packets may be forwarded between the transitive IP domains while maintaining enterprise segmentation. Reference to a transitive IP domain and/or transit domain may be interpreted as referring to one or more of the nodes that comprise the domain.

Embodiments described herein address the above-noted issues by embedding in packets of the IP flow a Network Services Header ("NSH") for carrying one or more context fields. NSH was designed to carry context in order to build a service chain that consists of an ordered sequence of service functions. The context was necessary to facilitate routing through the service chain. Embodiments described herein deviate from that presumed model of service chaining. In accordance with features of embodiments described herein, the context fields of the NSH are used to describe attributes of the flow that may be relevant to one or more transit IP domains. The NSH header does not dictate an order with which IP packets must transit the transitive IP domains; as a result, an IP packet may follow the native routed path (i.e., no service chaining will occur) as determined by the packet's destination. There is no requirement for a node within a transitive IP domain to detect or interpret the NSH or any of the context fields included therein; however, a node of any transitive IP domain that the packet traverses may detect and interpret the NSH context fields to invoke a service on behalf of the enterprise. This is an important distinction between the prescriptive relationship between the NSH imposer and ordered service functions in a service chain.

As will be described in greater detail herein below, embodiments described herein may realize multi-domain transitive context by adding an NSH to an IP packet at an enterprise router's egress interface into the first transitive IP domain and removing the NSH from the IP packet at an enterprise router's ingress interface at that last transitive IP domain. Any transport domain between the two enterprise routers may evaluate the NSH context. The enterprise may choose to encrypt the packet flow between its routers using IPsec; however, the NSH may be exposed (i.e., ESP follows NSH). Specifically, the original IP packet is encrypted, or tunneled, while the NSH sits outside the encapsulating/encrypting header. As a result, any context encoded in the NSH is preserved and revealed outside of the end-to-end security connection. Additionally, the IP addresses of the original flow (client-server, or tunnel end-points) are preserved during the NSH insertion; therefore, the inherent routing topology expected by the enterprise routers is maintained end-to-end. There is no tunnel overlay created by the NSH encapsulation.

Figure 5:
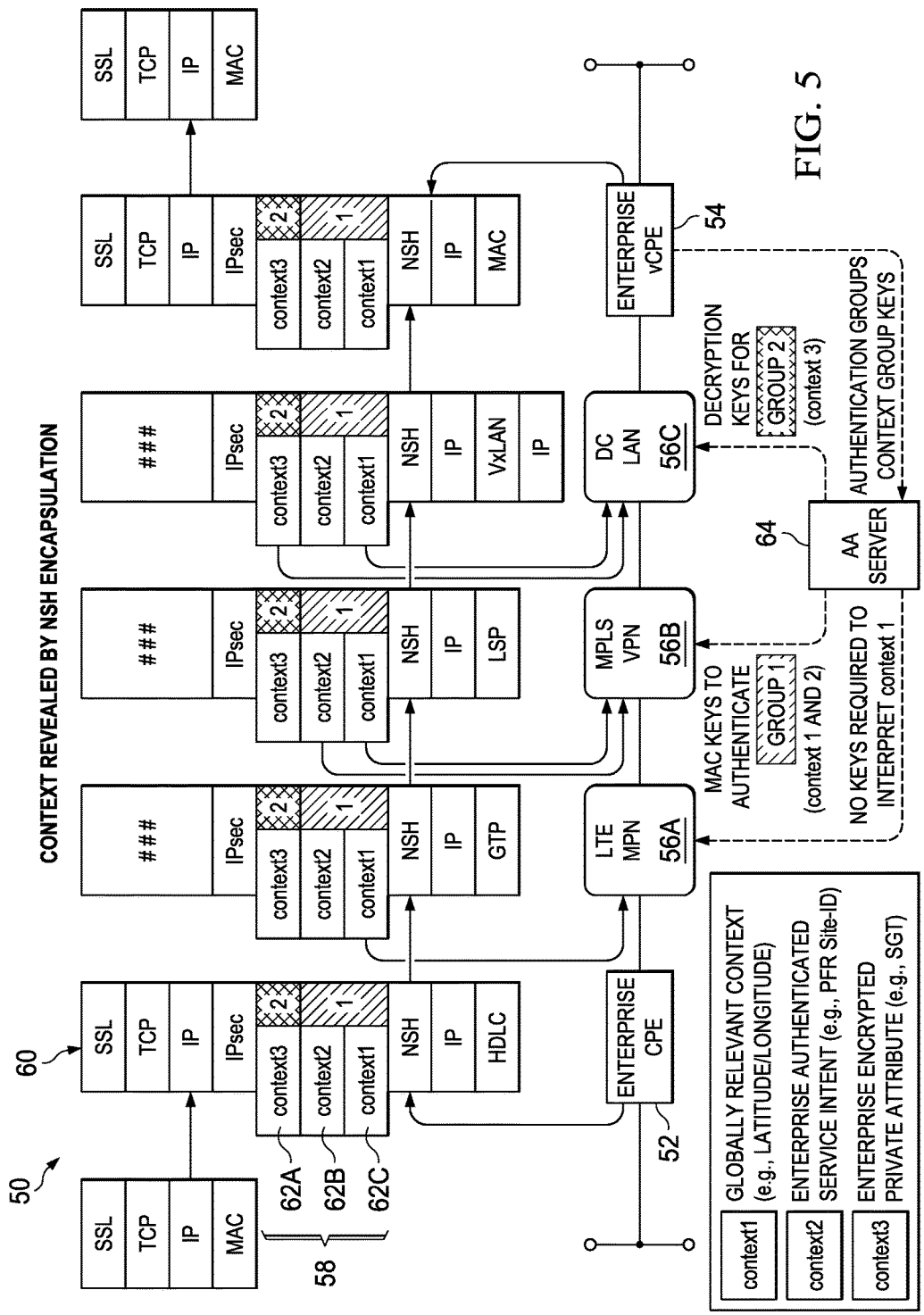
FIG. 5 illustrates a simplified block diagram of a communications network in which context is securely revealed outside of IPsec encapsulation and accessible to transitive IP domains in accordance with features of embodiments described herein for providing authenticated group context in transitive IP domains.

The above-noted concepts are illustrated in FIG. 5, in which a simplified block diagram of a communications network 50 for implementing features of embodiments described herein is depicted. As shown in FIG. 5, the network 50 includes enterprise CPE 52 and 54 interconnected via a secure VPN tunnel over an IP network, which may be implemented using several different transitive IP domains, represented in FIG. 5 by domains 56A-56C. As illustrated in FIG. 5, transport domains 56A-56C may be implemented as LTE MPN, MPLS VPN, and DC LAN, respectively. As noted above, multi-domain transitive context is realized by embodiments described herein by the addition by the CPE 52, which may be implemented as a gateway router, of an NSH 58 to an IP packet 60 at its egress interface into the first transitive IP domain 56A and by the removal by the CPE 54, which may also be implemented as a gateway router, of the NSH 58 from the IP packet 60 at its ingress interface to the last IP transitive domain 56C. As shown in FIG. 5, the NSH 58 includes multiple context fields 62A-62C, respectively designated context1, context2, and context3. For purposes of example only, it will be assumed that the context field 62A designated context1 includes globally relevant context (e.g., latitude/longitude), the context field 62B designated context2 includes enterprise authenticated service intent (e.g., PFR Site-ID), and the context field 62C includes an enterprise encrypted private attribute (e.g., SGT).

A primary feature of embodiments described herein is that the NSH imposer (i.e., the CPE 52) may associate a security group with each context field. The security group may be used to sign and/or encrypt the context. The enterprise defines the security groups and enables membership in those groups using an Authentication and Authorization Service, which may be implemented on an Authentication and Authorization ("AA") server. Additionally and/or alternatively, the AA service may be implemented on a Authentication, Authorization, and Accounting ("AAA") server. Membership in a security group allows any node of the member IP domain to authenticate and/or decrypt the context of that group. The enterprise may grant specific transitive IP domains membership in a security group such that nodes in a transitive IP domain may be authorized to perform enhanced services. The enterprise context and associated security group are presented in the NSH of an IP packet and it is accessible to each transitive IP domain. Interpretation of the NSH context is optional at each transitive IP domain; however, a transitive IP domain that has membership in the security group may decrypt and/or authenticate the context and act upon the packet according to the enterprise's specified intent as indicated in the context.

Figure 6:
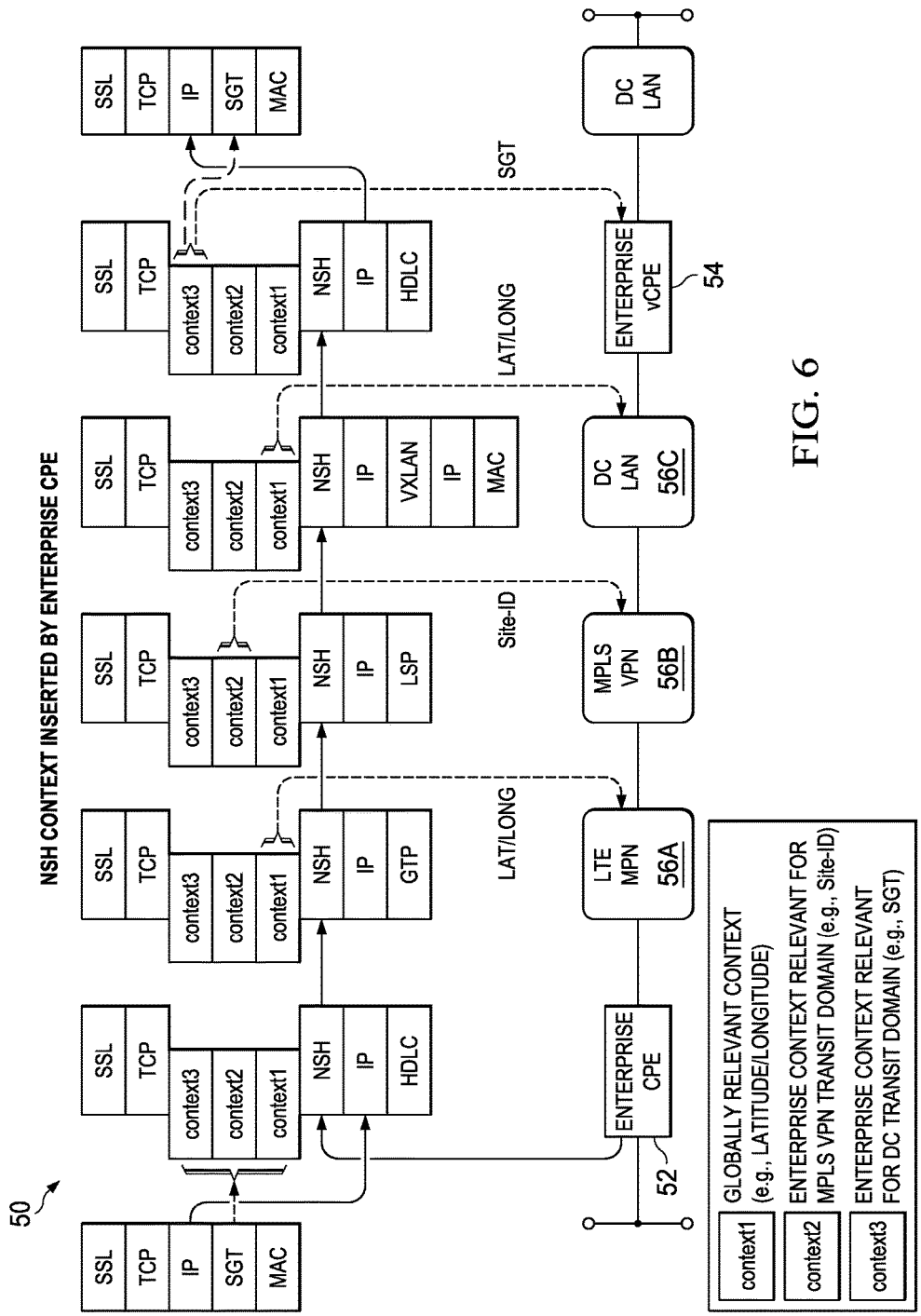
FIG. 6 illustrates a simplified block diagram of a communications network in which context is conveyed in a Network Services Header ("NSH") in accordance with features of embodiments described herein for providing authenticated group context in transitive IP domains.

Referring again to FIG. 5 and also to FIG. 6, in the illustrated embodiment, security group 1 is defined as including context1 and context2, while security group 2 is defined as including context3. The context included in the NSH is defined by the enterprise CPE gateways 52, 54; therefore, enterprise-specific context may be exposed to the transport domains 56A-56C, as best illustrated in FIG. 6. The utility of the context is a function of what the enterprise router reveals and what the transport domain is able to interpret. It will be assumed that the context embedded in the NSH may be self-descriptive or defined by reference. Much like standardized protocols have well-defined references for options and next-headers, the same may be defined in the NSH. For example, a globally understood context, such as latitude/longitude or country code might be encoded with a reference to a standard. Alternatively, the context information might be identified by a self-descriptive attribute embedded in the context header, such as an enterprise site identification, provider access circuit identifier, or logical group membership. Universal context may be standardized through an organization such as the IETF while enterprise-specific context may be addressed through optional identifiers. Each transport domain may be independently configured to interpret the context headers that are relevant for that transport domain while ignoring context that is irrelevant.

Given the sensitivity of the context, authentication and confidentiality need to be provided in connection with the context. The enterprise may assert context in the NSH header; however, a transport domain may want to validate the context to insure the context was not modified. This may be addressed by the enterprise router including a signature or message authentication code ("MAC") which may comprise a Context Group ID associated with a security group including one or more context fields. A node of a transitive IP domain that is an authorized member of a security group may interpret context fields of that security group and evaluate the signature or MAC of the context to insure that the contextual element has not been modified. This may be accomplished by including a Context Group ID associated with a security group for authentication services in the context header and granting membership in the security group to authorized transit domains. The authorized transit domains may obtain the keys necessary to authenticate the context, decrypt but not change the context, or decrypt, change, and re-encrypt the context while replacing the authentication tag.

Authentication may be performed in the following manner. The CPE 52, as the NSH imposer, may receive the necessary key or keys from an AA server 64 (FIG. 5) and secure the NSH. It will be noted that the term "securing", in all grammatical forms, as used in the specification or claims, is defined as encrypting and/or generating an authentication tag for at least some of the data of the NSH. Securing the NSH may involve encrypting part of the NSH and/or generating one or two authentication tags, which may include but are not limited to, for example, Message Authentication Codes ("MACs") for at least part of the NSH. It may be appreciated by those ordinarily skilled in the art that one or more of the MAC(s) may be replaced by a digital signature or signatures. Embodiments described herein do not preclude generating more than two authentication tags per NSH.

In certain embodiments the AA server 64 may include a key management service ("KMS") for generating keys. It may be appreciated that the KMS of AA server 64 may be based on an existing key management system, such as described in Internet Engineering Task Force ("IETF") Request for Comment ("RFC") 6407 entitled "The Group Domain of Interpretation" (hereinafter referred to as "IETF RFC 6407"), in IETF RFC 6043 entitled "MIKEY-TICKET: Ticket-Based Modes of Key Distribution in Multimedia Internet KEYing (MIKEY) (hereinafter referred to as "IETF RFC 6043"), and in "Key Management Service Architecture" (draft-abiggs-saag-key-management-service-00). Alternatively, the KMS of AA server 64 may be implemented to include the functionality described herein without being based on an existing key management system.

The keys for encryption/decryption and verifying/generating authentication tags are supplied to the various transitive IP domains 56A-56C by the AA server 64 based on security needs as determined by the CPE 52 as the NSH imposer. In one embodiment, keys and other security information are propagated to the transport domain nodes authorized by the CPE 52/NSH imposer as and when needed and the use of pair-wise symmetric keys (individual "personal" keys unique to each node) may be generally avoided. The transport domain nodes do not have to share any credentials. Typically, the nodes trust a third party (in this case, the AA server 64) with which the nodes have or can establish shared credentials. The pre-established trust relations are used to establish a security association. The key material is typically unique for each security group so that only the transport domains within the security group can act on the particular context of the NSH.

A KMS based on symmetric keys has particular advantages, as symmetric key algorithms are generally much less computationally intensive than asymmetric key algorithms and the size of cipher-text generated using a symmetric key algorithm is smaller compared to the cipher-text generated using an asymmetric encryption algorithm. Systems based on a KMS typically use a signaling mechanism that allows peers to retrieve other peers' dynamic credentials. A convenient way to implement such a signaling scheme is to use a ticket concept to identify and deliver keys. The ticket can be forwarded in the data of the NSH. The NSH imposer may request a ticket from the KMS and the NSH imposer may send the ticket in the NSH. One or more nodes of a transport domain may obtain the ticket from the NSH and request the KMS to provide the key material associated with the ticket. If transport domain node is authorized, then the KMS may return the corresponding keys. In some embodiments the keys may be delivered to the transport domain nodes without having to receive a request from the nodes.

In one embodiment, the ticket included in the NSH may be a variable length object used to identify and deliver keys over an untrusted network to transport domains, such as transport domains 56A-56C. The ticket could be self-contained (typically encrypted by the KMS for decryption by the KMS) with keys encoded/included in the ticket or with a handle or link to some internal data structure within the KMS. The ticket may optionally include information to identify the keys (received from the KMS) used to secure the NSH including the ticket. It should be noted that a ticket is not necessary (or may be replaced by another data element, as described above) if a non-ticket based key management service is used. For example, in the aforementioned GDOI key sharing mechanism, a key identifier is typically sent with the keys for the transport domains to identify the correct key. The key identifier may also be included in the ticket or some other data element which substitutes for a ticket.

NSH may also include a message integrity authentication tag and a context authentication tag, each of which may be a MAC or digital signature of various elements of the NSH. The encryption of the various context fields is typically performed and/or authentication tag(s) are typically generated by the NSH imposer when the NSH is generated. When a network packet is received by the transport domain, the authentication tags in the NSH are authenticated and one or more of the contexts are decrypted as necessary and in accordance with the keys supplied to the different transport domains.

In accordance with features of embodiments described herein, a transport domain may be entitled to decrypt and access one or more context fields contained in the NSH, as dictated by security groups to which the transport domain belongs and controlled by the encryption and authentication keys supplied to the transport domains by the AA server 64 as will be explained in greater detail below.

If the NSH imposer identifies that a subset of the transport domains may decrypt certain NSH data (i.e., context fields), the NSH imposer may inform the AA server to provide two authentication keys (one for generating the message integrity authentication tag and one for generating the context authentication tag). So for example, if the NSH imposer identifies that transport domains belonging to security group 1 should decrypt context fields context1 and context2, transport domains belonging to security group 1 will only be allowed to obtain the key(s)s for decrypting the context1 and context2 and for authenticating the message integrity authentication tag.

The NSH imposer requests from the AA server a ticket and key material including at least one key and (encryption/authentication) algorithm(s) for securing at least part of the NSH. The NSH imposer also conveys to the AA server the identities of the transport domains that are members of the security groups authorized to receive the cryptographic session information (keys, algorithms) associated with the ticket from the AA server. The AA server creates the keys and controls key distribution to the transport domains, as will be described in greater detail below. If the request from the NSH imposer is approved by the AA server, the AA server generates a ticket and keys for message authentication and encryption and conveys the ticket and key material along with negotiated encryption and authentication algorithms in a response message to the NSH imposer. The encryption and authentication algorithms may either be negotiated between the NSH imposer and the AA server or determined by the AA server and conveyed to the NSH imposer.

The ticket may include key information (the actual key or keys) or key generation information. In either case, during generation of the ticket by the AA server, the ticket may be encrypted by the AA server (for future decryption by the AA server) using a secret key that is unknown to the transport domains and typically also unknown to the NSH imposer. The NSH imposer is operative to receive, from the AA server, the ticket and key material including the key or keys for securing at least part of the NSH.

The NSH imposer generates and secures the NSH based on the received key or keys. The NSH imposer typically includes the received ticket in the NSH, encrypts the context of the NSH, generates one or two authentication tag(s) (e.g., based on CMAC, HMAC or any suitable authentication algorithm), and includes the authentication tags(s) in the NSH. One of the authentication tags may correspond to the message integrity authentication tag described above (which typically authenticates all the data of the NSH). The other authentication tag may correspond to the context authentication tag described.

Upon receipt of a packet containing an NSH by a node of a transit domain, the node may ensure that all TLVs required for NSH data authentication are present and may discard the NSH if one or more of the TLVs are absent. If all TLVs are present, the node continues with data validation. Next, the node may forward the ticket signaled in the NSH to the AA server/KMS and request that the AA server provide the cryptographic session details (including key(s) used in securing at least part of the NSH and algorithm(s) (authentication algorithms and optionally encryption/decryption algorithms)). Alternatively, the AA server may push the cryptographic session information to the authorized transit domain nodes implicitly. The transit domain node may match the appropriate keys pushed from the AA server using information in the ticket described in more detail below. The cryptographic session information may be pushed to the transit domain nodes at the same time that the ticket and keys are sent to the NSH imposer.

When a transit domain node forwards the ticket signaled in the NSH to the AA server and requests the AA server to provide the cryptographic session details, the request may be processed by the AA server based on a handle to key material included in the ticket. Alternatively, the ticket may include encrypted key information or encrypted key generation information. The transit domain sends the ticket including the encrypted information to the AA server in order for the AA server to decrypt the encrypted key or the encrypted key information and generate the key or keys.

Prior to the AA server sending the cryptographic session details to a transit domain, membership in the associated security group is determined and the ticket is checked for validity by the AA server. Authentication of a transit domain by the AA server may be performed using any suitable authentication mechanism, including but not limited to, a certificate based mechanism whereby each transit domain has a certificate that is presented to the AA server for authentication or via providing credentials such as an ID and secret key (e.g., by providing an HMAC of the ID with the secret key). After successful authentication and ticket validation (if relevant), the AA server conveys the cryptographic session information to transit domains that were authorized by the NSH imposer as being members of the security group.

Keys may be transferred from the AA server to the authorized transit domains via a secure channel.

A transit domain node may be operative to receive the cryptographic session information (including the key(s) and algorithms) from the AA server. It should be noted that the AA server may send the actual algorithm(s) in the response message or just state which algorithm(s) is to be used for encryption, decryption and authentication in the response message. The interaction between the transit domains and the AA server may be based on Transport Layer Security ("TLS") with a ciphersuite offering confidentiality protection. The encryption and authentication keys are typically not transmitted in clear for security reasons. The ticket may enable the transit domain to select the appropriate key material for use in decryption and/or authentication. For example, different keys for different context fields (depending on security group membership) may be pushed or retrieved from the AA server; therefore, the transit domain may need to distinguish between the different keys and this distinguishing may be performed based on information included in the ticket included in the NSH.

Each transit domain is typically operative to authenticate the authentication tag(s) included in the NSH according to the number of keys available to the transit domain from the AA server as described above. The transit domain node may calculate the message integrity for the entire NSH data using the MAC key and HMAC or CMAC algorithm obtained from the AA server for the ticket being carried in NSH. If a digital signature is used instead of a MAC, the digital signature is authenticated using the key(s) provided by the AA server. If the value of the newly generated digest is identical to the one in the NSH, the transit domain node has ascertained that the header has not been tampered with and validation succeeds. Otherwise, the NSH may be discarded. The context authentication tag may be validated by the transit domain in a similar way. If any of the NSH values are invalid then the NSH may be discarded.

After NSH data validation is complete, the transit domain node may decrypt the context field(s) using the supplied decryption key and the decryption algorithm obtained from the AA server. Once the context is in the clear, the transit domain node may employ the data contained in the context field to perform one or more services.

If the context was decrypted, the node re-encrypts the context. Alternatively, instead of decrypting and re-encrypting the context, the node may copy the context and decrypt the copy, in which case the node does not need to re-encrypt the context. If the node changes the context in any way, the node may generate one or more new authentication tags for the NSH to replace the existing authentication tags (generally after decrypting, updating and re-encrypting the context) to maintain message integrity of the NSH for subsequent validation by nodes in other IP transport domains. One of the newly generated authentication tags may correspond to the message integrity authentication tag described above. The other newly generated authentication tag may correspond to the context authentication tag described above, authenticates the context of the NSH (and possibly some more data of the NSH) but does not authenticate a header field or header fields of the NSH. A transit domain node that updates the NSH is typically provided with both the authentication keys (one for the message integrity authentication tag and one for the context authentication tag). The tags authenticating data that has been updated are typically regenerated. Thus, if the context was updated then authentication tags are typically regenerated. If none of the TLVs authenticated by the context authentication tag were updated then the context authentication tag does not need to be regenerated and replaced. The newly generated tag(s) are included in the NSH by the node in place of the previous tag(s) before the packet is forwarded to the next hop.

Figure 7:
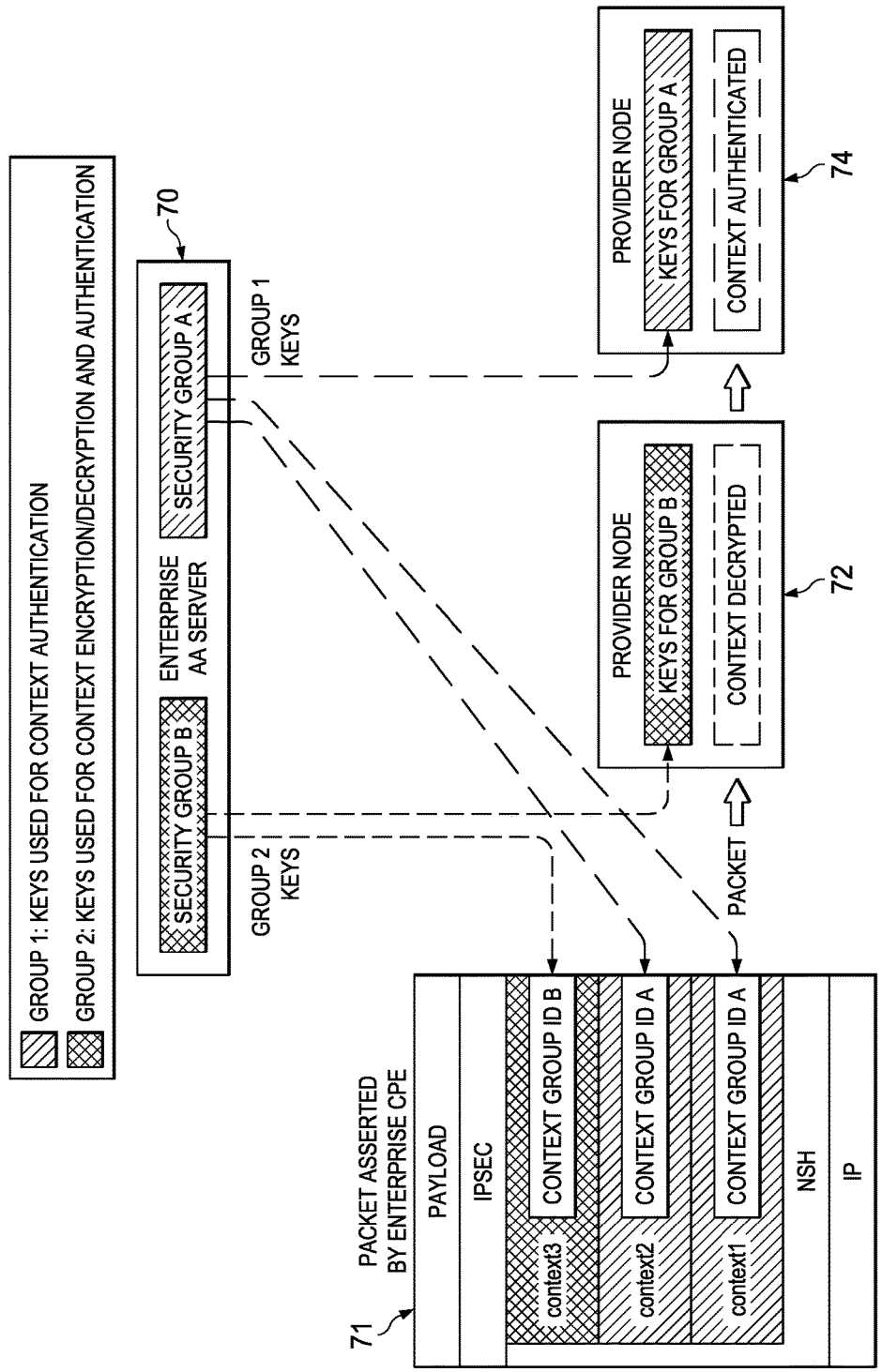
FIG. 7 is a simplified block diagram illustrating security and context group association in accordance with features of embodiments described herein for providing authenticated group context in transitive IP domains.

As shown in FIG. 7, an enterprise AA server 70 generates keys to be used in authenticating context1 and context2 of a packet asserted by an enterprise CPE (e.g., packet 71) using a MAC associated with a security group designated "Security Group A" (i.e., "Context Group ID A"). Additionally, enterprise AA server 70 generates keys to be used in authenticating context3 of the packet 71 using a MAC associated with a security group designated "Security Group B" (i.e., "Context Group ID B").

Accordingly, a node of a transport domain that is a member of security group A, represented in FIG. 7 by a node 72 is authorized to retrieve the keys and associated algorithms for security group A and those nodes may use the keys/algorithms to evaluate context1 and/or context2. In contrast, those same domains/nodes will have no visibility to context3, which is authenticated with a MAC associated with a security group designated "Security Group B" (i.e., "Context Group ID B"). Likewise, the nodes of transport domains that are members of a security group designated Security Group B, represented in FIG. 7 by a node 74, are authorized to receive keys and associated algorithms for Security Group B and nodes in those transit domains can use the keys/algorithms to decrypt context3 and evaluate the context. The other domains that are not members of Security Group B will have no access to the opaque data in context3. The use of group security applied to NSH context facilitates a scalable means of enabling enhanced services in transitive IP domains without requiring statically defined path forwarding mechanisms in either the enterprise router or the nodes of the transitive IP domains.

As described in detail hereinabove, a new method of conveying context end-to-end is defined in which any loosely coupled transitive IP domain may be authorized to decrypt and/or authenticate context. Enterprise defined security groups are used to manage key distribution among nodes in the transport domains using an Authentication and Authorization Service ("AAS"). The context imposed by the enterprise routers is associated with these security groups such that the scope of exposure is restricted by the enterprise as the packets traverse any of the transitive transport domains. The context exposed by the enterprise may be used by authorized transit IP domains to provide enhanced services on behalf of the enterprise. In summary, in one aspect of embodiments described herein, context is conveyed between two enterprise sites and transit domains between the enterprise sites are selectively granted authority to access some portion of the context. In another aspect, group keying material is conveyed to enterprise routers and provider nodes in transit domains based on enterprise authorized access. In yet another aspect, use of the context by the nodes in transit domains improves the services offered to enterprises.

Embodiments described herein introduce a method of conveying context embedded in the NSH that does not specify which service functions are required or the specific order. The context defines a service criteria that transport domain node may evaluate or ignore; therefore, IP packets can be delivered end-to-end regardless of the capabilities of the transport domains. Secondly, the context may be encrypted and/or authenticated using group association where group membership is used to control the accessibility and integrity of the contextual elements in the NSH. Group membership is controlled by the enterprise such that authorized transport domains may evaluate the contextual elements in NSH and act according to contractual specifications made by the enterprise and each candidate transport domain. Unlike service chaining, no explicit peer relationship is imposed by the enterprise NSH imposer and the ingress node of the transport domain. Any potential ingress node of a transport domain can register with the enterprise authentication service, receive authorization for group membership, and retrieve the necessary keys to evaluate NSH contextual elements imposed by router associated with that enterprise. Thus, the solution scales much better using a group model than a pairwise relationship between NSH imposer and every potential service function.

FIG. 8 is a flowchart illustrating steps that may be performed by an NSH imposer in accordance with embodiments described herein. In step 80, the NSH imposer requests a ticket and/or key material from an AA server. In certain embodiments, the key material includes at least one key and encryption and/or authentication algorithms for securing context fields. The NSH imposer also conveys to the AA server security group and context ID information for identifying which transport domain nodes are authorized to cryptographic session information (keys, algorithms) associated with the a context field and/or security group.

If the request sent in step 80 is approved, the AA server generates the requested material and conveys it back to the NSH imposer. As previously noted, the encryption and authentication algorithms may either be negotiated between the NSH imposer and the AA server or determined by the AA server and conveyed to the NSH imposer. It should be noted that the KMS 14 may send the actual algorithm(s) in the response message or just state which algorithm(s) is to be used for encryption, decryption and authentication in the response message. In step 82, the NSH imposer receives from the AA server the requested material.

In step 84, the NSH imposer generates and secures the context within the NSH using the received materials, including encrypting context fields as dictated by security group association and generating one or more authentication tags for inclusion in the NSH. As previously noted, one of the authentication tags may correspond to a message integrity authentication tag for authenticating all of the data of the NSH, while the other may correspond to a context authentication tag described above that authenticates the context fields of the NSH. In step 86, the NSH imposer sends the packet with the NSH to the first transit domain.

FIG. 9 is a flowchart illustrating steps that may be performed by a transport domain node upon receipt of a packet with an NSH in accordance with embodiments described herein. In step 90, the node receives key material from the AA server. It will be noted that keys will be provided to the node in accordance with security group membership of the transport domain. In some embodiments, a provide edge node may pre-subscribe to the AA groups based on a configured behavior that the enterprise expects the provider edge node to perform. As a result, the provider edge node may already have the group keys necessary to perform operations on the packet. The provider edge node ("PE") may be configured to subscribe to a group upon configuration of a service expected by an enterprise. Key material may be pushed by the AA server upon subscription, requested by the PE upon subscription, or requested by the PE upon receipt of a packet.

In step 92, which may occur before, after, or contemporaneously with step 90, the node receives the NSH packet. In step 94, the node uses the key material to authenticate the tags, decrypt the context fields associated with the security group of which the transport domain is a member. In step 96, the node performs one or more network services using the decrypted context, which may include changing the context as necessary. In step 98, the node reencrypts the context, generates new authentication tags if the context was changed, and sends the packet with the NSH to a next node along the predefined path.

In example implementations, at least some portions of the activities related to the embodiments described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 10:
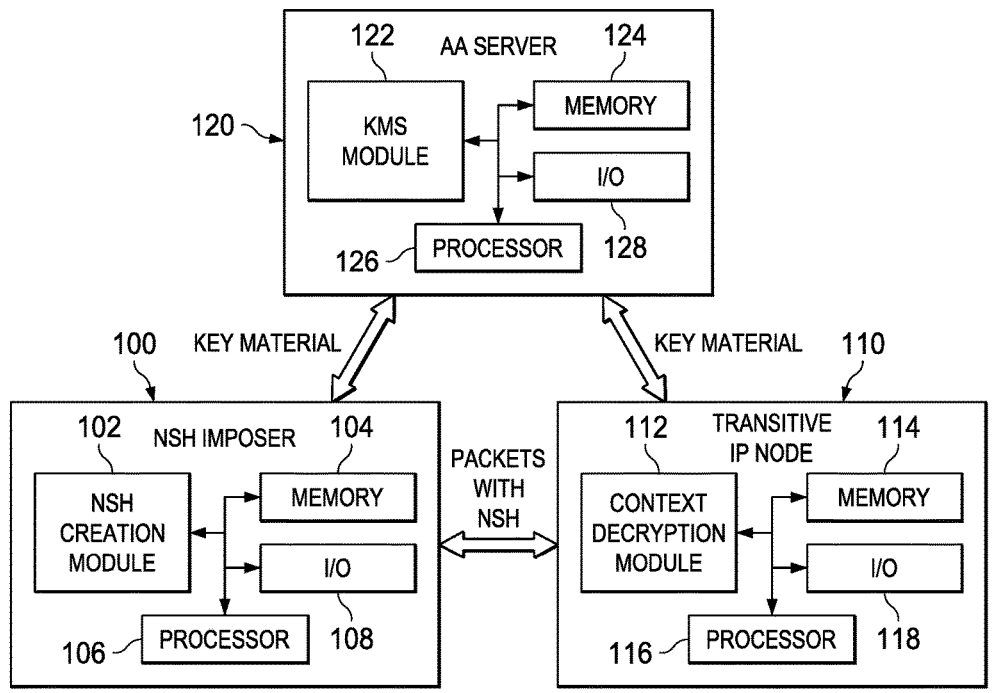
FIG. 10 of an NSH imposer, a node of a transitive IP network, and a Authentication and Authorization ("AA") server in accordance with features of embodiments described herein for providing authenticated group context in transitive IP domains.

For example, referring to FIG. 10, an NSH imposer 100, which may be an enterprise gateway router, may include an NSH creation module 102 comprising software embodied in one or more tangible media for facilitating the activities described herein. In particular, the NSH creation module 102 comprises software for facilitating the processes illustrated in and described with reference to FIG. 8. The NSH imposer 100 may also include a memory device 104 for storing information to be used in achieving the functions as outlined herein. Additionally, the NSH imposer 100 may include a processor 106 that is capable of executing software or an algorithm (such as embodied in module 102) to perform the functions as discussed in this Specification, as well as one or more I/O devices, collectively designated in FIG. 10 by a reference numeral 108.

The NSH imposer 100 may be communicatively coupled to at least one transitive IP domain node, represented in FIG. 10 by a node 110, which may include a context decryption module 112 comprising software embodied in one or more tangible media for facilitating the activities described herein. In particular, the context decryption module 112 comprises software for facilitating the processes illustrated in and described with reference to FIG. 9. The node 110 may also include a memory device 114 for storing information to be used in achieving the functions as outlined herein. Additionally, the node 110 may include a processor 116 that is capable of executing software or an algorithm (such as embodied in module 112) to perform the functions as discussed in this Specification, as well as one or more I/O devices, collectively designated in FIG. 10 by a reference numeral 118.

An AA server 120 is communicatively coupled to both the NSH imposer 100 and the node 110 and includes a KMS module 122 comprising software embodied in one or more tangible media for facilitating the activities described herein. In particular, the KMS module 122 comprises software for facilitating the processes illustrated in and described with reference to FIGS. 8 and 9. The AA server 120 may also include a memory device 124 for storing information to be used in achieving the functions as outlined herein. Additionally, the AA server 120 may include a processor 126 that is capable of executing software or an algorithm (such as embodied in module 122) to perform the functions as discussed in this Specification, as well as one or more I/O devices, collectively designated in FIG. 10 by a reference numeral 128.

It will be recognized that the NSH imposer 100, the node 110, and the AA server 120 of FIG. 10 may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIGS. 5 and 6. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIGS. 8 and 9 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 8 and 9. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 11:
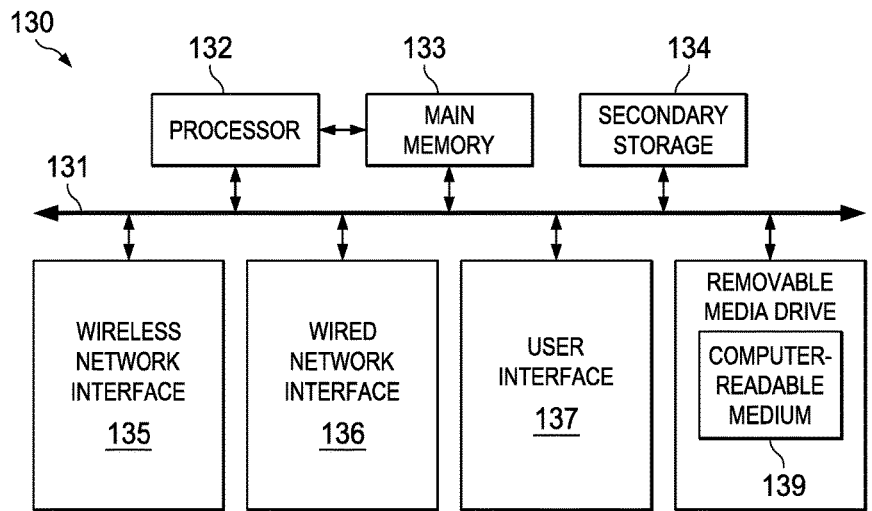
FIG. 11 is a simplified block diagram of a machine comprising an element of the communications networks embodying features described herein for providing authenticated group context in transitive IP domains.

Turning to FIG. 11, FIG. 11 illustrates a simplified block diagram of an example machine (or apparatus) 130, which in certain embodiments may be enterprise CPE, an AA server, or a transitive IP domain node, that may be implemented in embodiments described herein. The example machine 130 corresponds to network elements and computing devices that may be deployed in a communications network, such as enterprise CPE, an AA server, and/or a transitive IP domain node. In particular, FIG. 11 illustrates a block diagram representation of an example form of a machine within which software and hardware cause machine 130 to perform any one or more of the activities or operations discussed herein. As shown in FIG. 11, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 11 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, AA server, NSH imposer, and transitive nodes are network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 133, secondary storage 134, computer-readable medium 139) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 132) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment 10, 110, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    at a node of a transitive Internet Protocol (IP) network, the node being associated with a first security group of multiple security groups:
        receiving a data packet that includes a Network Services Header ("NSH") appended thereto after the data packet is encrypted and/or encapsulated in a tunnel header, wherein a subset of multiple context fields of the NSH is associated with the first security group;
        accessing context contained in the NSH by performing one or more of decrypting and authenticating the subset of context fields associated with the first security group;
        performing a network service in connection with the received data packet using the accessed context; and
        forwarding the received packet to a next node subsequent to the performing.

2. The method of claim 1, wherein the accessing further comprises:
    obtaining key material from an Authentication and Authorization ("AA") server; and
    decrypting the subset of context fields using the key material.

3. The method of claim 1, further comprising reencrypting the subset of context fields prior to the forwarding.

4. The method of claim 2, wherein the accessing further comprises authenticating the subset of context fields using the key material obtained from the AA server.

5. The method of claim 1, wherein the network service comprises at least one of,
    Virtual Private Network ("VPN") segmentation,
    Quality of Service ("QoS") prioritization,
    whitelisting,
    blacklisting, caching,
    video compression, and
    security threat analysis.

6. The method of claim 1 further comprising, prior to the accessing, determining whether the transitive IP network node is a member of a security group authorized to access the context.

7. One or more non-transitory computer readable media encoded with a computer program that includes instructions to cause a processor of a node of a transitive Internet Protocol (IP) network that is associated with a first security group of multiple security groups, to:
    receive a data packet that includes a Network Services Header ("NSH") appended thereto after the data packet is encrypted and/or encapsulated in a tunnel header, wherein a subset of multiple context fields of the NSH is associated with the first security group;
    access context contained in the NSH by performing one or more of decrypting and authenticating the subset of context fields associated with the first security group;
    perform a network service in connection with the received data packet using the accessed context; and
    forward the received packet to a next node subsequent to performance of the network service.

8. The media of claim 7, further including instructions to cause the processor to:
    obtain key material from an Authentication and Authorization ("AA") server, and
    decrypt the field of the NSH using the key material.

9. The media of claim 7, further including instructions to cause the processor to:
   reencrypt the context prior to forwarding the received data packet to the next node.

10. The media of claim 8, further including instructions to cause the processor to:
   authenticate the subset of context fields using the key material obtained from the AA server.

11. The media of claim 7, wherein the network service comprises at least one of,
   Virtual Private Network ("VPN") segmentation,
   Quality of Service ("QoS") prioritization,
   whitelisting,
   blacklisting,
   caching,
   video compression, and
   security threat analysis.

12. The media of claim 7, further including instructions to cause the processor to;
   determine whether the transitive IP network node is a member of a security group authorized to access the context.

13. An apparatus configured to operate as a node in a transitive Internet Protocol (IP) network, the node associated with a first security group of multiple security groups, the apparatus comprising:
   a memory element configured to store data;
   a processor operable to execute instructions associated with the data; and
   a context decryption module configured to:
      receive a data packet that includes a Network Services Header ("NSH") appended thereto after the data packet is encrypted and/or encapsulated in a tunnel header, wherein a subset of multiple context fields of the NSH is associated with the first security group;
      access context contained in the NSH by performing one or more of decrypting and authenticating the subset of context fields associated with the first security group;
      perform a network service in connection with the received data packet using the accessed context; and
      forward the received packet to a next node subsequent to performance of the network service.

14. The apparatus of claim 13, wherein the context decryption module is further configured to:
   obtain key material from an Authentication and Authorization ("AA") server; and
   decrypt the subset of context fields using the key material.

15. The apparatus of claim 14, wherein the context decryption module is further configured to:
   authenticate the subset of context fields using the key material obtained from the AA server.

16. The apparatus of claim 13, wherein the network service comprises at least one of,
   Virtual Private Network ("VPN") segmentation,
   Quality of Service ("QoS") prioritization,
   whitelisting,
   blacklisting,
   caching,
   video compression, and
   security threat analysis.

17. The apparatus of claim 13, wherein the context decryption module is further configured to:
   determine whether the node is a member of a security group authorized to access the context.

18. The apparatus of claim 13, wherein the context decryption module is further configured to:
   reencrypt the context prior to forwarding the received data packet to the next node.

19. The method of claim 1, further comprising the node implementing a first Virtual Private Networking (VPN) method and the next node implementing a second VPN method, and wherein the first VPN method is different from the second VPN method.

20. The media of claim 7, wherein the node is configured to implement a first Virtual Private Networking (VPN) method and the next node is configured to implement a second VPN method, and wherein the first VPN method is different from the second VPN method.

* * * * *